US007283283B1

(12) United States Patent
Sievertson et al.

(10) Patent No.: US 7,283,283 B1
(45) Date of Patent: Oct. 16, 2007

(54) METHODS AND SYSTEM FOR INLINE DIGITAL PRINTING

(75) Inventors: Dana Sievertson, Wilmette, IL (US); Nils Bjors, Barrington, IL (US)

(73) Assignee: Mallace industries Corp., Clinton, CT (US)

( * ) Notice: Subject to any disclaimer, the term of this patent is extended or adjusted under 35 U.S.C. 154(b) by 1006 days.

(21) Appl. No.: 10/286,753

(22) Filed: Nov. 4, 2002

Related U.S. Application Data

(60) Provisional application No. 60/330,951, filed on Nov. 5, 2001.

(51) Int. Cl.
*H04N 1/40* (2006.01)

(52) U.S. Cl. ...................................... 358/3.32; 358/296

(58) Field of Classification Search ............... 358/3.32, 358/502, 296, 414; 101/270, 271, 51, 55, 101/56, 133, 146, 266
See application file for complete search history.

(56) References Cited

U.S. PATENT DOCUMENTS 6,535,299 B1 * 3/2003 Scherz ...................... 358/1.18
6,923,115 B1 * 8/2005 Litscher et al. ............... 101/35
6,959,164 B1 * 10/2005 Baughman et al. ......... 399/327

* cited by examiner

*Primary Examiner*—Thomas D. Lee
*Assistant Examiner*—Stephen Brinich
(74) *Attorney, Agent, or Firm*—Oliff & Berridge, PLC

(57) ABSTRACT

A friction driven printing device capable of delivering high-resolution images on the vertical surface of corrugated boxes, shipping cases, chip board, and the like, has a print cylinder assembly that is housed in a print carriage that is mountable on a conveyor line. The print cylinder has a wall that is perforated and includes a stencil and a screen mounted on the print cylinder. Ink from an ink cartridge is pumped into the print cylinder via an ink feed tube and deposited in the print cylinder. A roller squeegee is used to meter the ink uniformly across the print area of the print cylinder and ultimately onto the printer substrate.

23 Claims, 8 Drawing Sheets

METHODS AND SYSTEM FOR INLINE DIGITAL PRINTING

This application claims the benefit of U.S. Provisional Application No. 60/330,951, filed on Nov. 5, 2001.

BACKGROUND OF THE INVENTION

1. Field of Invention

This invention is directed to a printing system for delivering high-resolution images on vertical surfaces of recording media having a non-negligible third dimension.

2. Description of Related Art

A variety of printing methods are familiar to most people, including offset, letter press and gravure lithography, inkjet printing, laser printing, and impact printing. A technique that has nearly vanished over the past 20 years is mimeography.

Mimeography was widely used in the 1940s and 1950s in schools, hospitals and the military as an alternative to commercial printing. Traditional mimeography is inexpensive and can be accomplished "in house" with little capital investment and a high level of flexibility. A user needs only a typewriter or an impact printer, a mimeograph printer, which is about the size of a small photocopier, stencils, ink and paper. The heart of the traditional mimeograph system is the stencil, which is traditionally made of a natural fiber tissue and coated to block the flow of ink. To create an image, the stencil is placed in a typewriter. The typing keys remove the coating on impact. The stencil is then mounted on the mimeograph print cylinder. Ink, flowing from inside the cylinder through a porous metal cylinder surface and then through the voids created in the stencil by the typewriter, transfers the image to the paper substrate. Print quality is not comparable to typed memos or letters. As a result, use of the traditional mimeograph process was limited in commercial offices. Schools, hospitals and the military used this traditional mimeograph process because the copy is legible, but more importantly, inexpensive.

Mimeography in its original form has virtually disappeared in the industrial world. It has been largely replaced by photocopier equipment. However, recently mimeography was reborn when a "digital stencil" was developed. Digital stencils are made of a non-woven backing of natural and polyester fibers laminated to a polyester thin film of about 6-8 gauges. The digital stencil is imaged by using thermal printheads such as those used in facsimile machines and a wide variety of label printers. Such thermal printheads have a resolution of about 200 to 600 dots per inch. The digital stencil system, also known commercially as a digital duplication system, offers vastly improved print quality over traditional mimeograph equipment.

Thermal printheads accept digital data. As a result, stenciled images may be created in computers or digital scanners, as opposed to old-fashioned typewriters and impact printers. From the standpoint of print quality, digital duplicator systems are not comparable with photocopying. However, the improved print quality and low operating cost is useful in many traditional office settings.

The typical digital duplicator looks and performs very much like a small photocopier. An original image is placed on the machine's plate scanner, which scans and digitizes the image and downloads a copy to a thermal imager. The thermal imager burns holes in a plastic stencil at 300 or 400 dots per inch. The stencil is automatically loaded onto the print cylinder and paper is automatically fed into the printer, printed and discharged. The operator need only enter the quantity of copies desired and select the print speed. In some machines, a computer can be used for the digitizing process where an original does not exist. Thus, the operator can create an image having text, graphics, and the like on a personal computer and download the image directly to the thermal imager to start the automatic printing process.

SUMMARY OF THE INVENTION

Various conventional embodiments of digital duplicators have many features in common, such as only printing on a horizontal plane and requiring the use of fine print paper, which is necessary because fine print paper offers a very consistent surface. In all conventional digital duplication machines, an opposing impression roll is pressed against the underside of the print medium to force un-used ink back into the print cylinder to prevent ink from building up under the stencil, and thus creating an image quality problem. Because the opposing impression roller is required, conventional digital duplicators cannot simultaneously print on opposing sides of the print medium. Additionally, all conventional digital duplication machines automatically feed and control the path of the paper. Conventional digital duplicators primarily reside in an office environment, because conventional digital duplicators are not designed for use in a factory setting that is often too harsh for sensitive electronic equipment.

Because of the limitations of conventional digital duplicators, conventional digital duplicators are inappropriate for printing on inconsistent surfaces, such as, for example, those found on chipboard and corrugated shipping boxes. Corrugated shipping boxes have a very irregular and abrasive surface. Not only is the quality of the "surface linear fall" inferior to that of the fine paper that is necessary for conventional digital duplicators, the surface also undulates as a result of the underlying corrugations. Further, the quality of the surface print area of corrugated shipping boxes is inconsistent due to wide variations in wood pulp makeup, processing variations from paper mill to paper mill, and in the percentage of recycled fiber. Although printing on such inconsistent surfaces is discussed above, printing on other surfaces, including consistent surfaces such as, for example, printing on paper, textiles, metals, or the like, is contemplated.

This invention provides systems and methods for delivering high-resolution images on the vertical surface of recording media, such as corrugated sheets, corrugated boxes and shipping cases, chip board, or any other recording medium that has a non-negligible third dimension, such as filled shipping cases.

In various exemplary embodiments, a print cylinder assembly is housed in a print carriage that is, in various exemplary embodiments, detachably mountable on a conveyor line to print images on such recording media.

In various exemplary embodiments, the systems and methods of this invention include applying a pseudoplastic ink within a vertically mounted print cylinder having a wall. The print cylinder wall has a perforated surface formed using a metal or mesh material. A stencil is mounted on the exterior surface of the print cylinder. Ink from an ink cartridge, or reservoir, is pumped into the print cylinder via an ink feed tube and deposited in the print cylinder. A roller squeegee is used to meter the ink uniformly across the print area of the print cylinder and ultimately onto the printed substrate. In an exemplary embodiment of the invention, the ink is deposited on the floor of a vertically mounted print cylinder proximally to the cylinder wall and the squeegee.

A sensor, mounted on an ink sensor assembly proximally to the ink feed tube and the surface of the print cylinder, maintains the level of ink within the print cylinder near or at a desired level of ink by regulating the amount of ink pumped from the ink reservoir through the ink feed tube. In various exemplary embodiments, the ink feed tube may be constructed of copper, plastic, or the like. In various exemplary embodiments, the sensor may be a capacitive sensor and the ink may be a pseudoplastic ink. Shear forces may cause the pseudoplastic ink to rise forming a vertical bead on the wall of the cylinder.

In various exemplary embodiments, the stencil is mounted on the print cylinder and attached by a stencil hold-down device. The stencil hold-down device maintains the proper tension on both the leading and trailing ends of the stencil to provide a compressive force usable to force unused ink back into the print cylinder. This tends to reduce ink buildup under the stencil. To assist in this process, in various exemplary embodiments, the squeegee has a serrated surface that provides channels for any excess ink to flow back into the print cylinder. In various exemplary embodiments of the invention, the stencil hold-down device may be a mechanical, leveraged stencil hold-down device.

The print cylinder assembly is housed in a print carriage that is, in various exemplary embodiments, detachably mountable on a conveyor line. In various exemplary embodiments, the stencil hold down device has an arm extending outwardly from the print carriage into the path of items traveling on the conveyor line. The arm of the stencil hold down device catches the leading edge of an item as it travels on the conveyor line and causes the print cylinder to turn. This causes the print cylinder to apply an image to the item. This also tends to reduce the friction of the item on the stencil, because the stencil is in motion with the item as the item passes by the print cylinder. Because many items, such as corrugated boxes, have extremely abrasive surfaces, it is desirable to reduce the friction on the stencil and the print cylinder to increase the useful life of these desirable components.

In various exemplary embodiments of the invention, upper and lower O-rings may be provided on the surface of the print cylinder to further reduce the amount of friction to the stencil caused by a passing print surface. The O-rings also provide a drive surface to rotate the print-cylinder. In various exemplary embodiments, the O-rings are formed using rubber, or the like, which provides a high coefficient of friction between the passing item and the print cylinder.

In various exemplary embodiments of the systems and methods according to this invention, the print cylinder includes a cam that advances the print cylinder when it is displaced from a home position forward to the home position. In various exemplary embodiments, the cam rides on an elliptically shaped interior surface of the print cylinder. Because of the elliptical interior surface, the print cylinder returns to the “home” or starting position after a full or a partial rotation. Thus, in such exemplary embodiments the print cylinder remains in registration, and is always ready to print the following item. The full rotation also ensures that all ink is cleared from the surface of the print cylinder so ink does not build-up under the surface of the stencil.

In various exemplary embodiments, to reduce the force of impact from the items to be printed on the device, the print carriage is spring-loaded. In various exemplary embodiments, to overcome the recoil in the springs caused by the impact of the moving items, a shock absorber may be used. In various exemplary embodiments, to deal with convex and concave variations in the vertical print surface of the items, the carriage includes a gimbal for the print cylinder to allow the surface of the print cylinder to remain in contact with an uneven print surface.

The design of the print device, as described above, makes it possible for the printing device to be friction driven. Because, in various exemplary embodiments, the print cylinder revolves as the result of the driving force of the item to be printed as that item passes by the print cylinder, no external power source is needed to drive the print cylinder. Thus, in such exemplary embodiments, it is not necessary to match the print cylinder speed to the speed of the item passing the printing cylinder. Normally, this force is provided by the conveyor which conveys the item past the print cylinder. However, in various exemplary embodiments, the drive force can also be accomplished by manually pushing the item past the printing device on a non-driven conveyor or table. In other words, in various exemplary embodiments, the device does not control the item being printed. Rather, the item being printed controls the device.

In various exemplary embodiments, a mounting system for the device allows the entire device to be adjustably mounted on a conventional conveyor system, such that the location of the print image on the item may be at any desired height. Further, additional devices may be added, or “stacked”, on the mounting system to allow for multiple images to be deposited on the item in a single pass. The devices may also be mounted opposing each other on the conveyor to allow for two sides of item to be printed simultaneously.

In various exemplary embodiments, the system may be used with a conventional personal computer and existing commercial software to create stencils useable with the system.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
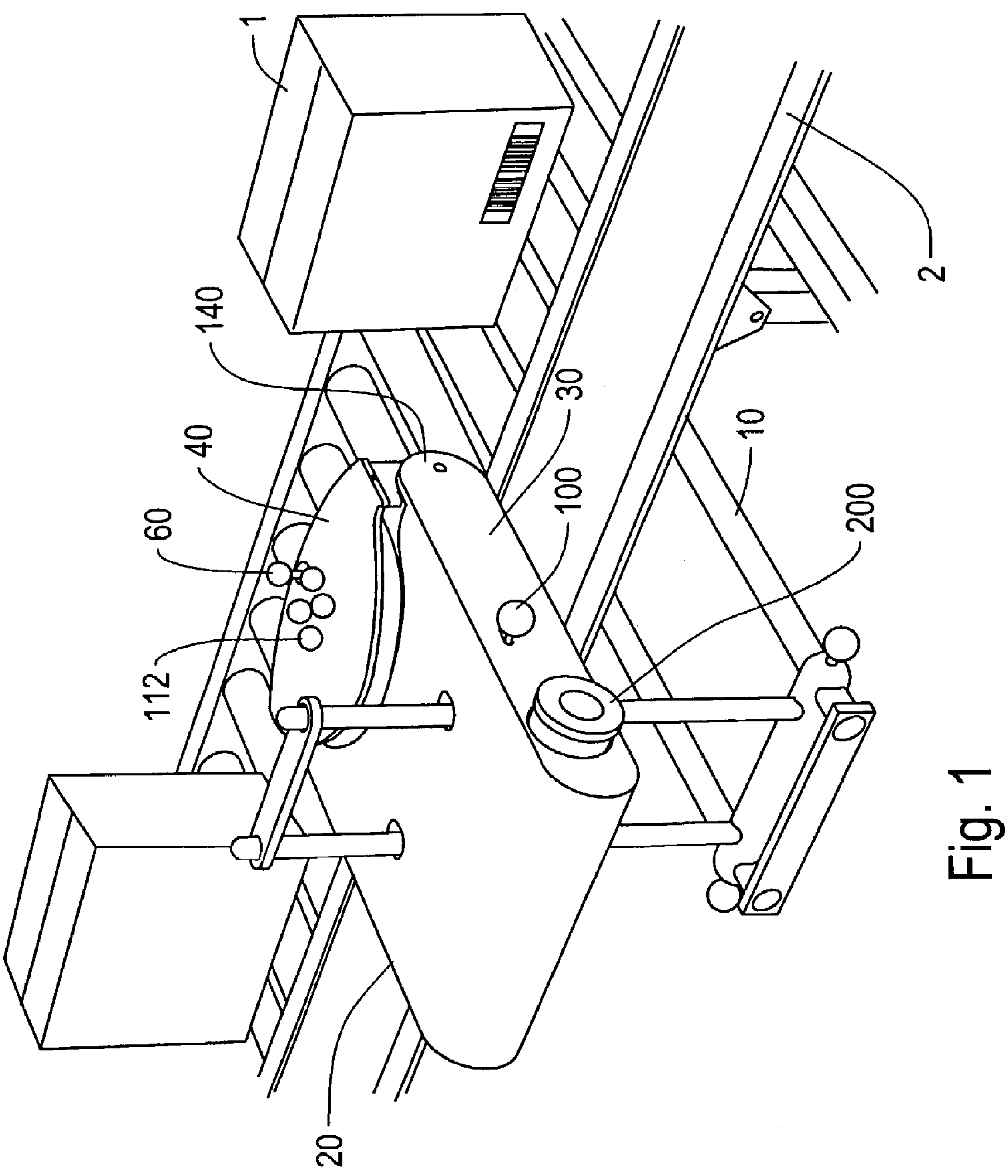
FIG. 1 is a perspective view of one exemplary embodiment of a printing device and the mounting frame according to this invention.

FIG. 1 illustrates one exemplary embodiment of a printing device 20 and mounting frame 10 according to this invention. As shown in FIG. 1, the printing device 20 includes a print cylinder mount 40 that is pivotably attached to a print carriage 30 by a print cylinder mount pivot 140. The printing device 20 is adjustably attached to a mounting frame 10 by a vertical adjust control device 100. The vertical adjust control device 100 allows the printing device 20 to be adjusted in a vertical direction at the desired location. The mounting frame 10, and the attached printing device 20, are horizontally adjustable by a horizontal adjustment control device 110. The horizontal adjustment control device 110 allows the printing device 20 to be horizontally positioned relative to a conveyor system 2 at any desired location. In various exemplary embodiments of the invention, the horizontal adjust control 110 includes a crank (not shown) for fine horizontal positioning of the printing device 20.

Figure 2:
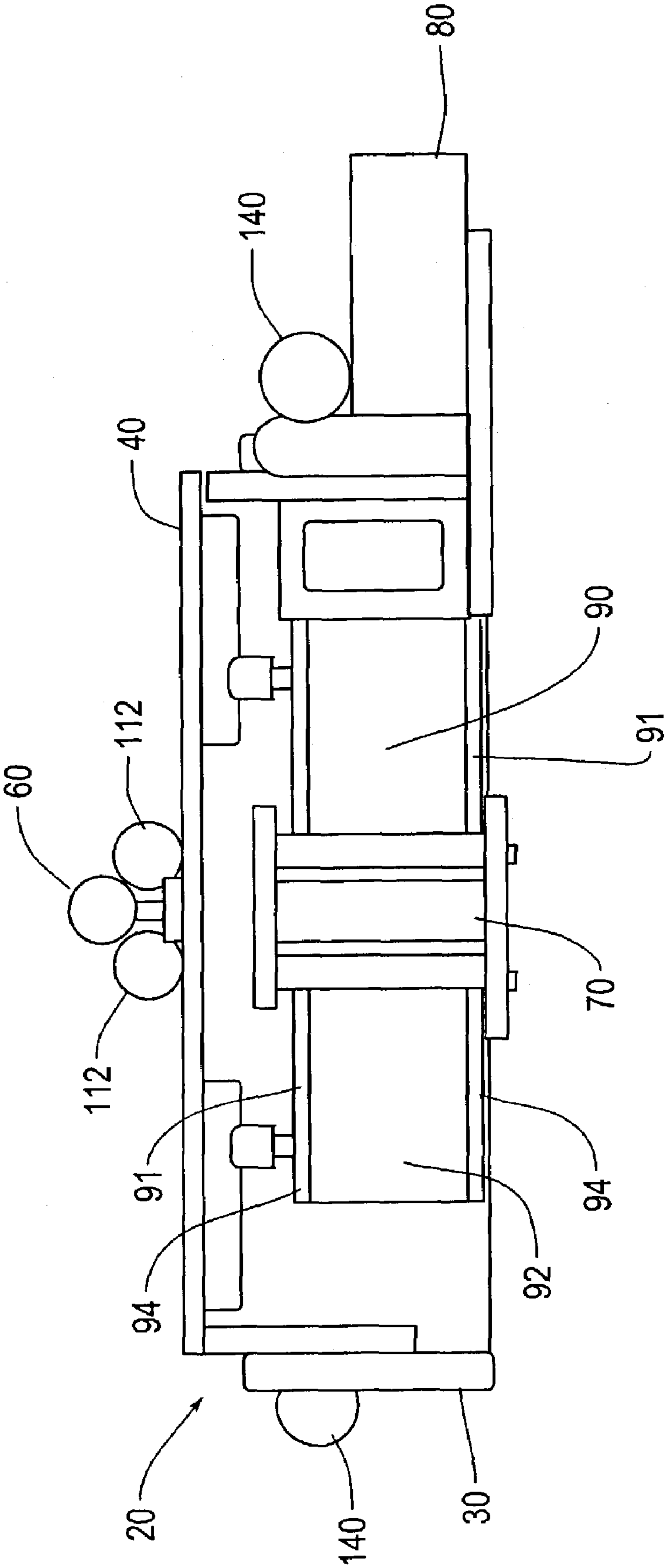
FIG. 2 is a perspective front view of one exemplary embodiment of a printing device according to this invention.

FIG. 2 shows front view of one exemplary embodiment of the printing device 20 of FIG. 1. As shown in FIG. 2, the printing device 20 includes the print cylinder mount 40 that is pivotably attached to the print carriage 30 by a pair of print cylinder mount pivots 140. The print cylinder 90 has top and bottom end caps 94 attached at upper and lower ends, respectively, of a perforated metal screen 93 that forms an exterior wall or surface of the print cylinder 90. The print cylinder 90 is rotationally attached to the print cylinder mount 40 by a number of print cylinder fasteners 112. A stencil hold-down device 70 retains a stencil 92 on the outer surface of the print cylinder 90. One or more metal gussets 71 (FIG. 9) are disposed at the top and bottom of the stencil hold-down device 70 to protect the stencil 92, silk screen (not shown), and O-rings 91 when an item to be printed 1 contacts the printing device 20. A guide foot 80 is attached to the print carriage 30 and aligns the item 1 to be printed so that the item to be printed 1 is properly positioned relative to the printing device 20 for receiving a print image. The guide foot 80 also protects the print cylinder 90 and the stencil 92 from damage that would otherwise occur by impact with the item to be printed 1.

The O-rings 91 are disposed around the peripherally of the stencil 92 on the surface of the print cylinder 90 to provide a drive surface to aid in rotating the print cylinder 90 as the item to be printed 1 passes the printing device 20 for printing. The O-rings 91 also aid in protecting the stencil 92 and silk screen (not shown) from impact and friction caused by the item to be printed 1 as the item to be printed passes the printing device 20.

Figure 3:
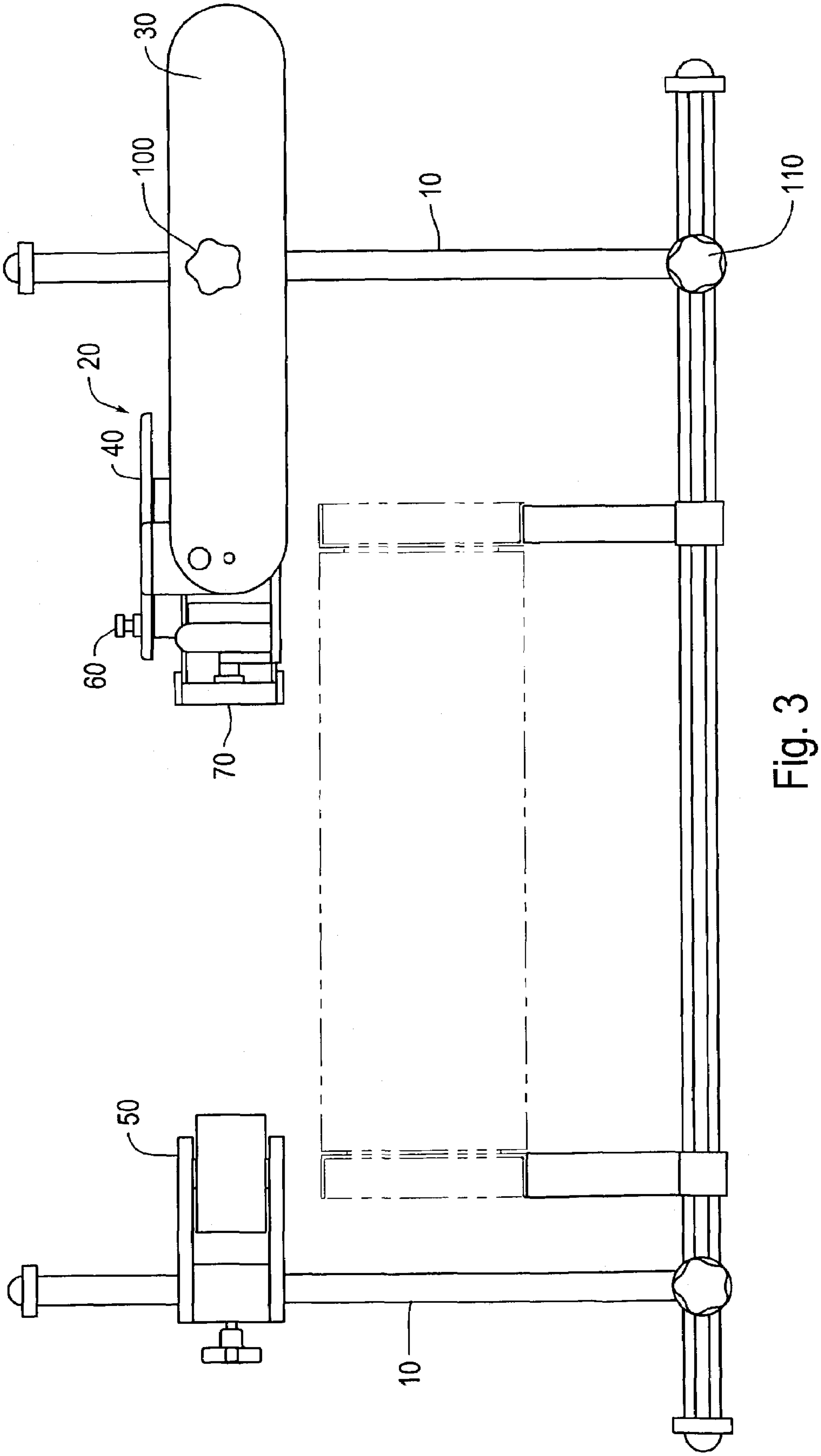
FIG. 3 is a side view of one exemplary embodiment of a printing device and the mounting frame according to this invention.

FIG. 3 shows a side view of one exemplary embodiment of the printing device 20 of FIG. 1. As shown in FIG. 3, the mounting frame 10 may be attached to the conveyor system 2 and allows the printing device 20 to be adjustably positioned relative to the conveyor system 2 and the items to be printed 1 that are placed on the conveyor 2. As shown in FIG. 3, in various exemplary embodiments of the systems and methods according to the invention, an impression roller 50 is adjustably attached to the mounting frame 10 opposite to the printing device 20 to assist in the proper alignment of the item to be printed 1 and to provide a resistant force to maintain the vertical surface of the item to be printed 1 in contact with the print cylinder 90.

Figure 4:
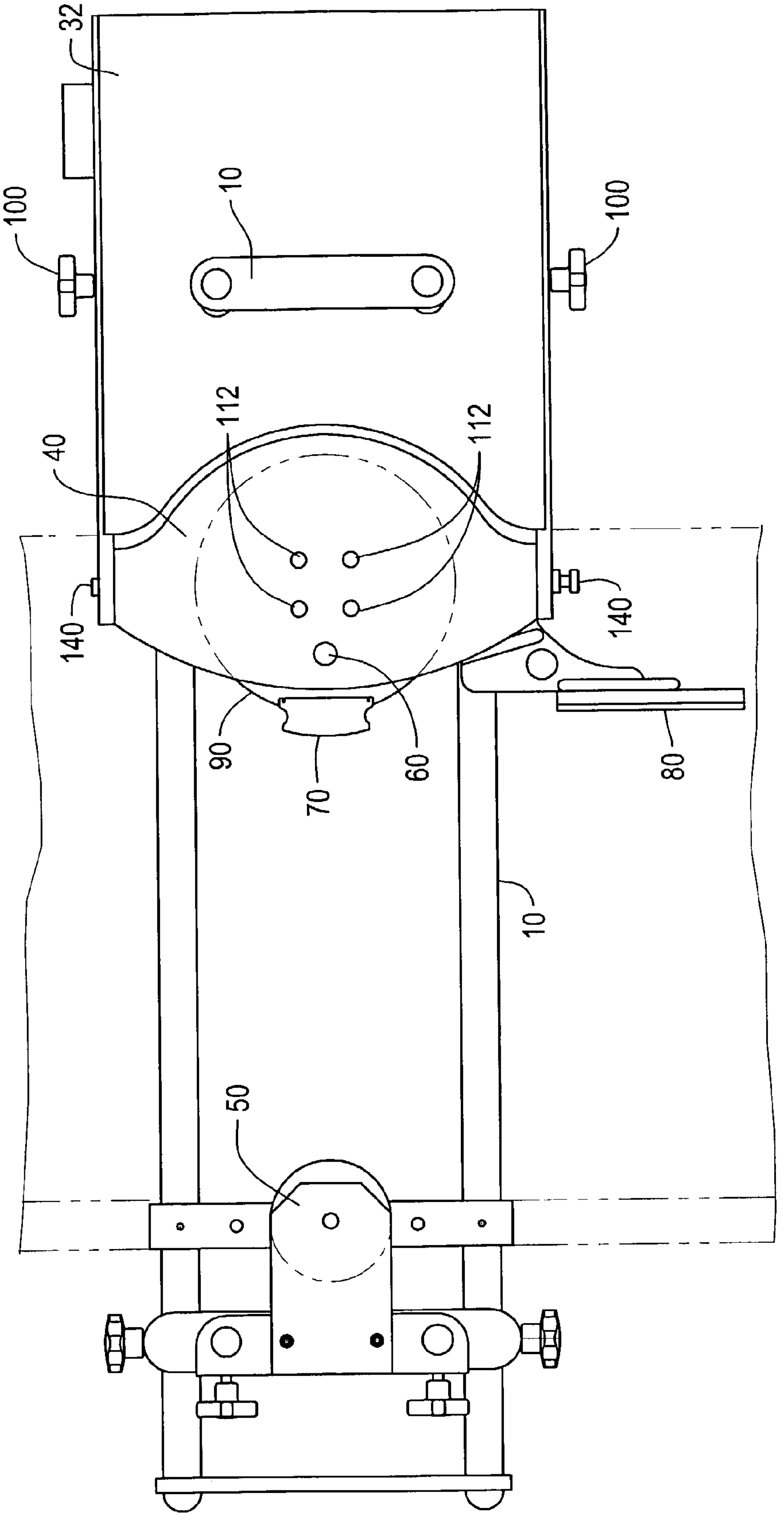
FIG. 4 is a top view of one exemplary embodiment of a printing device with a cover and the mounting frame according to this invention.

FIG. 4 shows a top view of one exemplary embodiment of the printing device 20 of FIG. 1 with a top cover 32 in place and the impression roller 50 positioned opposite to the printing device 20, each being adjustably attached to the mounting frame 10.

As the item to be printed 1 approaches the printing device 20, the item to be printed 1 is properly aligned by the guide foot 80 and the impression roller 50. The item to be printed 1 then engages the stencil hold-down device 70 and the O-rings 91. The stencil hold-down device 70 is securely attached to the print cylinder 90 at a number of end caps 94 by mounting plates (not shown). In various exemplary embodiments, the surface of the end caps 94 may be knurled to provide a bonding surface to adhere the metal screen 93. The stencil hold-down device 70 receives a leading edge of the item to be printed 1 as the item to be printed 1 passes by the printing device 20. As a result, the print cylinder 90 rotates, and the item to be printed 1 engages the O-rings 91 to provide a drive force to the print cylinder 90. As the print cylinder 90 rotates, an image is printed on the vertical surface of the item to be printed 1 as the item to be printed 1 passes by and contacts the printing device 20. The impression roller 50 holds the item 1 against the print cylinder 90 as the item to be printed 1 is printed. As the print cylinder 90 rotates, ink deposited in the print cylinder 90 is uniformly distributed on the wall 93 of the print cylinder 90 by the squeegee 280. The ink is forced through the cylinder wall 93, the stencil 92, and the silkscreen (not shown), to print an image on the item to be printed 1. The silkscreen may be comprised of silk, metal mesh, stainless steel, or another appropriate known or later-developed material that is suitable for the purposes of the invention. Although, the above described exemplary embodiments describe ink passing through each of the cylinder wall 93, the stencil 92 and the silkscreen (not shown), the invention also contemplates the ink passing through only the cylinder wall 93, or any combination of the cylinder wall 93, the stencil 92 and the silkscreen.

Figure 5:
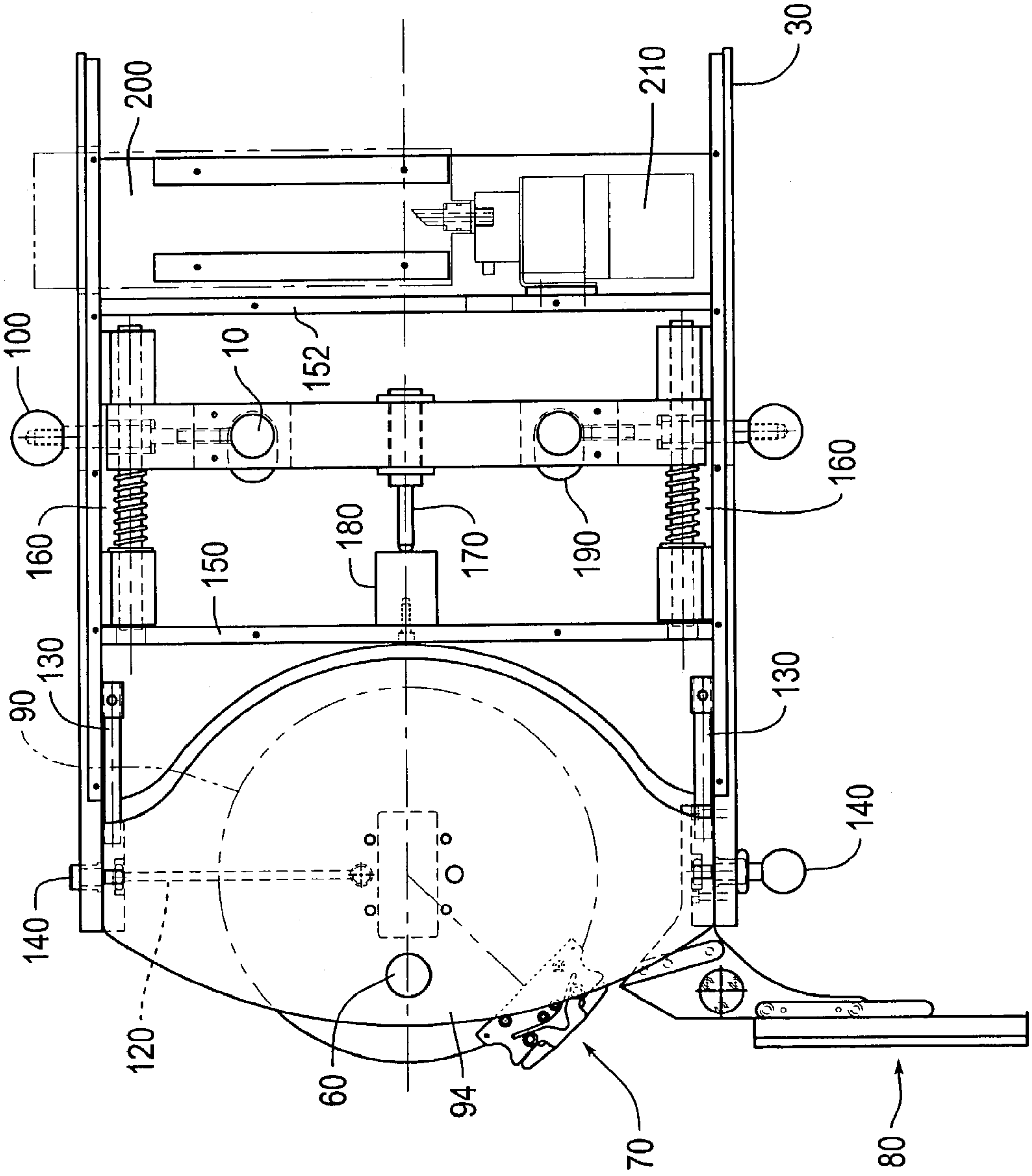
FIG. 5 is a detailed top view of one exemplary embodiment of a printing device without the cover according to this invention.

FIG. 5 shows a detailed top view of one exemplary embodiment of the printing device 20 of FIG. 1 without the cover 32. As shown in FIG. 5, the print cylinder 90 is rotatably attached to the print cylinder mount 40 and is pivotably attached to the print carriage 30 at the print cylinder mount pivots 140. A gimbal 130 is disposed between opposing sides of the print carriage 30 and in front of the front cross-member 150 to allow the print cylinder 90 and the print cylinder mount 40 to rotate in a horizontal plane. This allows contact to be maintained between the stencil 92 and the item to be printed 1 as the image is printed onto the item to be printed 1, regardless of minor inclinations of the vertical surface of the item to be printed 1 from true vertical relative to the surface of the printing cylinder 90. A print cylinder lock 60, which can be disposed on the surface of the print cylinder mount 40, may be used to lock the print cylinder 90 in place to prevent the print cylinder 90 from rotating when desired, such as while changing the stencil 92 or during shipping of the printing device 20.

When the item to be printed 1 that is traveling down the conveyor system 2 is received by the stencil hold-down device 70, the force of the impact of the item to be printed 1 on the printing device 20 is absorbed by a number of springs 160 and/or a shock absorber 170. In various exemplary embodiments, the first ends of the one or more springs 160 are attached to the front cross-member 150 and the second ends of the one or more are attached to a carriage dampener 162. In various exemplary embodiments, the shock absorber 170 is attached to the carriage dampener 162 at a first end and is in contact at a second end with a shock absorber block 180. In various exemplary embodiments, the shock absorber block 180 is attached to the front cross member 150. Upon impact with the item to be printed 1, the one or more springs 160 and the shock absorber 170 absorb the impact. The print carriage 30 may travel relative to the mounting frame 10 by at most the distance of a number of elongated holes 190.

In various exemplary embodiments, a rear cross-member 152 is disposed between opposing sides of the print carriage 30. In various exemplary embodiments, an ink cartridge 200 is detachably connected to the ink pump 210. In various exemplary embodiments, the ink cartridge 200 and the ink pump 210 are mounted rearward of the rear cross-member 152 and between opposing sides of the print carriage 30.

Figure 6:
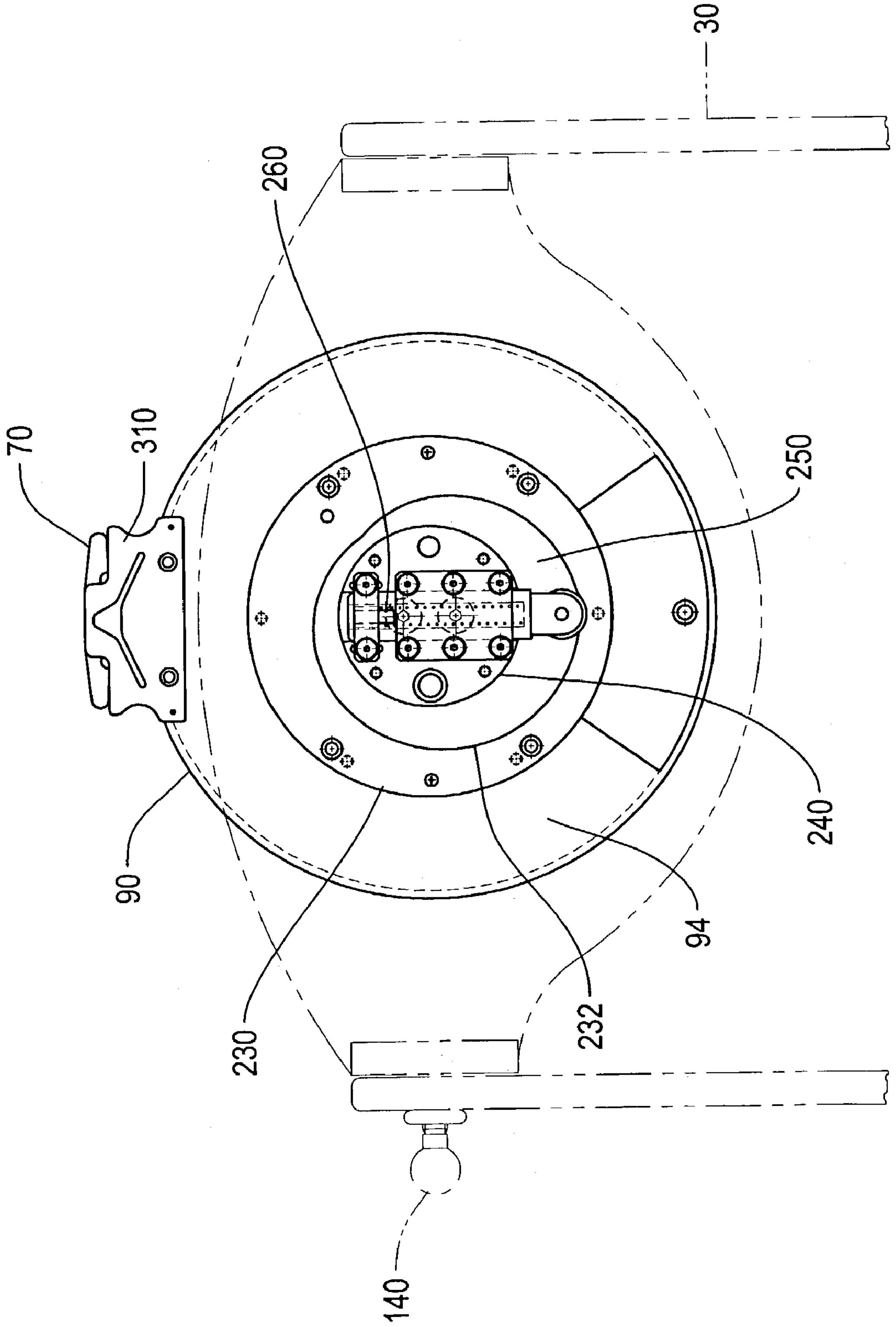
FIG. 6 is a detailed top view of one exemplary embodiment of a print cylinder and a cam configuration of the printing device according to this invention without print cylinder mount.

FIG. 6 shows a detailed top view of one exemplary embodiment of the print cylinder 90 and a cylinder rotation assembly 240 of FIG. 1 without the print cylinder mount 40 in place. As shown in FIG. 6, the print cylinder 90 has an end cap 94 at the top end of the print cylinder 90. A cam ring 230, which has an elliptical inner surface 232, is affixed to the end cap 94. A roller wheel 250 is maintained in contact with an elliptical inner surface 232 of the cam ring 230 by a cam spring 260. This assembly causes the print cylinder 90 to rotate by about 360° when the stencil hold-down device 70 engages a leading edge of the item to be printed 1 traveling on the conveyor system 2. In various exemplary embodiments of the invention, the roller wheel 250 is maintained in forceable contact with the elliptical inner surface 232 of the cam ring 230 by one or more cam springs 260. In various exemplary embodiments, the tension of the one or more cam springs 260 may be selected based on the temperature of the operating environment of the printing device 20 and/or the viscosity of the ink.

Figure 7:
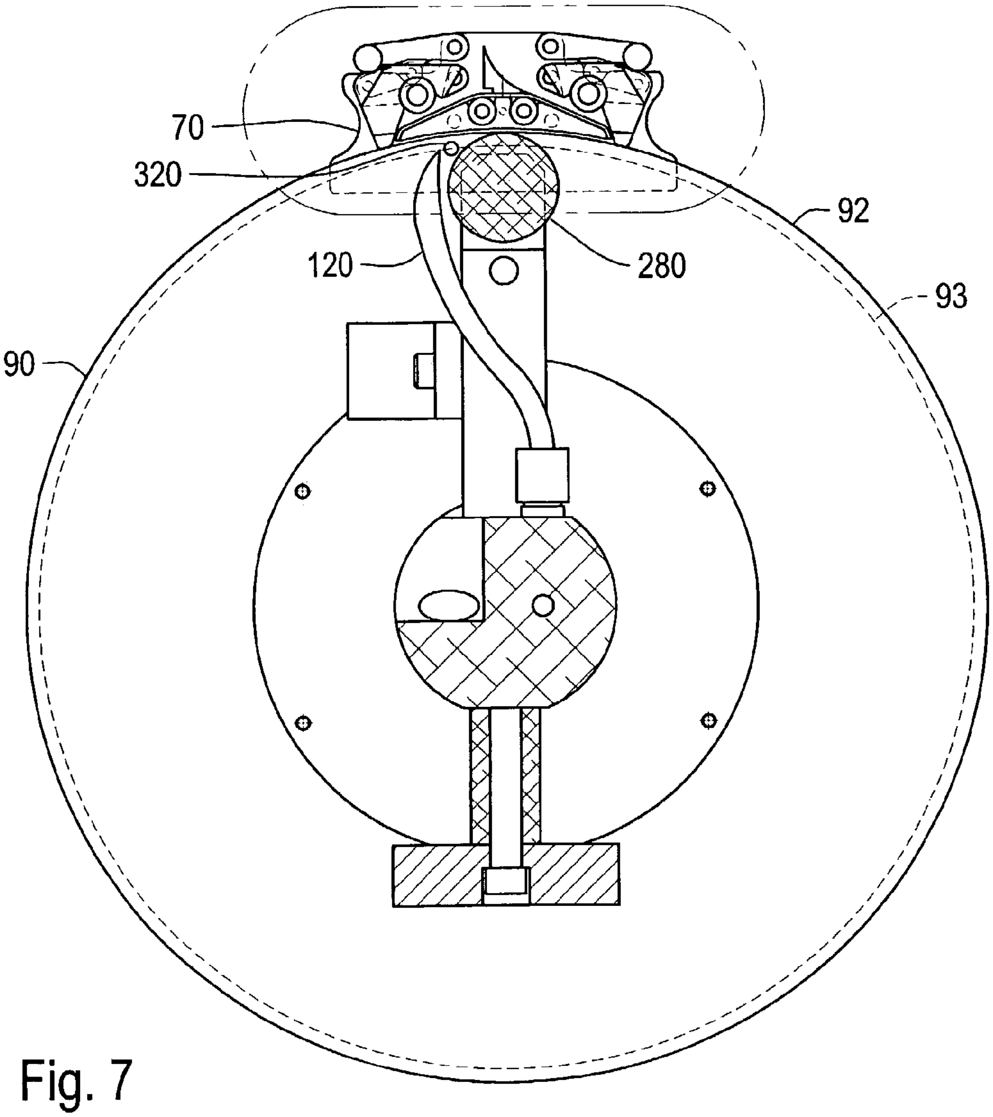
FIG. 7 is a detailed top view of the print cylinder and ink feed tube configuration of the printing device according to this invention without end cap.

FIG. 7 shows a detailed top view of one exemplary embodiment of the print cylinder 90 and the ink feed tube 120 without the end cap 94 in place. As shown in FIG. 7, a roller squeegee 280, which has, in various exemplary embodiments, a plurality of diamond shaped cuts forming a serrated surface, is disposed against the inner wall of the print cylinder 90. Ink from the ink cartridge 200 is pumped by the ink pump 210 through the ink feed tube 120 and deposited on the bottom end cap 94, or floor, of the print cylinder 90. Shear forces cause the ink to rise vertically up the wall 93 of the print cylinder 90. The roller squeegee 280 forces the ink through the wall 93 of the print cylinder 90 as the print cylinder 90 rotates due to an item to be printed 1 engaging the stencil hold-down device 70. The flow of ink through the feed tube 120 is controlled by a sensor 320, which activates an ink pump 210 to pump ink from the ink cartridge 200 when ink is required. As the print cylinder 90 rotates, the roller squeegee 280 presses ink through the wall 93 of the print cylinder 90, the stencil 92, and the silk screen (not shown). Once the ink has passed through the print cylinder 90 the wall 93, the silk screen (not shown) and the stencil 92, the ink is deposited in an image-wise pattern on the vertical surface of the item to be printed 1.

Figure 8:
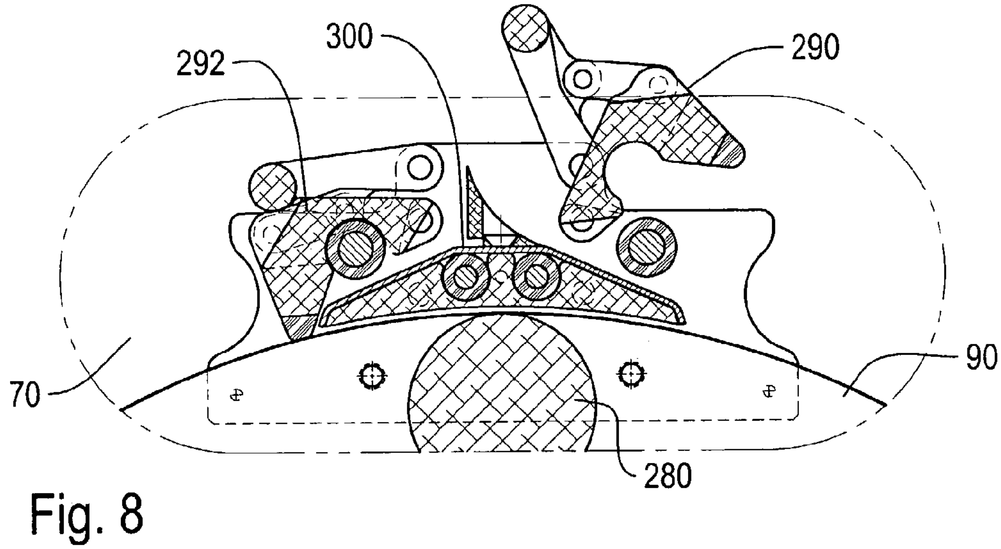
FIG. 8 is a detailed top view of the stencil hold-down device of the printing device according to this invention.

The stencil 92 is held in place on the outer surface of the wall 93 of the print cylinder 90 by the stencil hold-down device 70. In various exemplary embodiments, the stencil hold-down device 70 is attached to the print cylinder 90 at the end caps 94 by mounting plates (not shown). As shown in FIG. 8, in various exemplary embodiments, the stencil hold-down device 70 includes a first stencil lock 290, shown in an open position, and a second stencil lock 292, shown in a closed position. The first and second stencil locks 290 and 292 securely fasten the two ends of the stencil 92 over the mesh screen and around the print cylinder 90.

Although the above exemplary embodiments have been described using ink, and more specifically a pseudoplastic ink, other fluids are contemplated by this invention. Such fluids may include, for example, paints, pigments, dyes, stains, adhesives, or the like, and any combination thereof.

Figure 9:
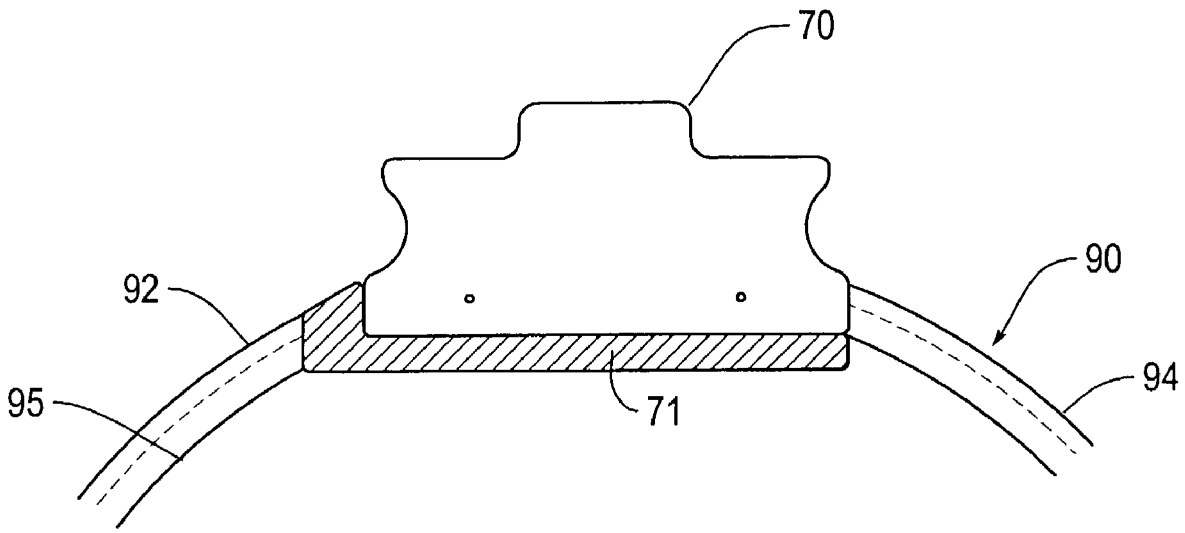
FIG. 9 is a detailed top view of the stencil hold-down device and a gusset according to this invention.

Although the above exemplary embodiments are described using a screen disposed over the wall 93 of the print cylinder 90, the invention contemplates the use of a pad 95 (FIG. 9), or cushion, disposed between the wall 93 of the print cylinder 90 and the screen (not shown), to provide a cushioned and/or resilient surface of the print cylinder 90. The pad 95 may be formed using felt, neoprene, nylon, or other known or later developed material suitable for the stated purpose. Although FIG. 9 shows the pad 95 disposed on the print cylinder 90 and the gusset 71 connected to the stencil hold-down device 73, it should be appreciated that either the gusset 71 or the pad 95 may be used without the other.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An apparatus for delivering a high-resolution image to a surface, comprising:
- a print carriage;
- a print cylinder mount pivotally attached to a print carriage, the print cylinder mount pivoting in a first plane;
- a print cylinder rotationally attached to the cylinder mount, the print cylinder rotating in a second plane that is substantially perpendicular to the first plane; and
- a supply tube, a first end of the supply tube connected to a reservoir, a second end of the supply tube located at the print cylinder, the supply tube usable to supply fluid from the reservoir to the print cylinder.

2. The apparatus of claim 1, further comprising impact dampeners usable to reduce a force of impact upon the apparatus by an item to be printed as the item to be printed engages the apparatus to receive a printed image.

3. The apparatus of claim 1, further comprising a mounting frame, wherein the mounting frame is adjustable in one or more axes of movement.

4. The apparatus of claim 3, wherein the apparatus is adjustably attached to the mounting frame in at least one axis of movement.

5. The apparatus of claim 1, wherein the print cylinder further comprises:
- top end cap;
- a bottom end cap;
- a cylindrically-shaped perforated wall disposed between the top end cap and the bottom end cap;
- a stencil hold-down device disposed on an outer surface of the perforated wall;
- a screen disposed over the wall of the print cylinder, wherein the screen is attached to the stencil hold-down device;
- a stencil disposed over the screen and attached to the stencil hold-down device; and
- a squeegee disposed inside of, and in contact with, an inner surface of the wall of the print cylinder, wherein the squeegee forces the fluid from the supply tube through the wall of the print cylinder, the screen and the stencil, as the print cylinder rotates to print an image on surface of the item to be printed.

6. The apparatus of claim 5, wherein the squeegee is disposed inside of, and at a distance away from, the inner surface of the wall of the print cylinder.

7. The apparatus of claim 5, wherein at least one of the top end cap and the bottom end cap is knurled to provide a bonding surface for the perforated wall.

8. The apparatus of claim 7, wherein the squeegee has a serrated surface that provides channels to allow excess fluid to flow back into the print cylinder.

9. The apparatus of claim 1, further comprising a sensor disposed proximally to the supply tube and an inner surface of a wall of the print cylinder, the sensor usable to detect a level of the fluid within the print cylinder.

10. The apparatus of claim 1, wherein the fluid is a pseudoplastic fluid.

11. The apparatus of claim 5, wherein the hold-down device maintains a desired tension on at least one of the screen and the stencil to reduce build-up of the fluid under the stencil.

12. The apparatus of claim 5, further comprising at least one O-ring disposed around the print cylinder that is usable to engage an item to be printed and that is usable to provide a drive surface to cause the print cylinder to rotate upon engaging the item to be printed.

13. The apparatus of claim 12, wherein the hold-down device extends outwardly from the print cylinder to engage an item to be printed as the item moves past the print cylinder, wherein at least one of the hold-down device and the at least one O-ring contacts a leading edge of the to be printed item and rotates the print cylinder to apply the fluid to the to be printed item.

14. The apparatus of claim 11, wherein the hold-down device further includes at least one gusset disposed on the hold-down device to protect the stencil and the screen from impact with an item to be printed.

15. The apparatus of claim 1, wherein the print cylinder further comprises a cam disposed in an elliptically shaped interior portion of the print cylinder, wherein the cam advances the print cylinder a complete revolution to a start position when the print cylinder has been displaced from the start position during printing.

16. The apparatus of claim 1, further comprising an impression roller attached to a mounting frame and disposed opposite the printing cylinder to align and provide a resistant force to an item to be printed.

17. The apparatus of claim 1, wherein the apparatus is friction driven.

18. The apparatus of claim 5, further comprising at least one pad disposed between the wall and the screen to provide flexibility to a surface of the print cylinder that contacts the item.

19. A system for delivering a high-resolution image to a surface, comprising:

a mounting frame; and a first printing device adjustably attachable to the mounting frame, comprising:

a print carriage;

a print cylinder mount pivotally attached to a print carriage, the print cylinder mount pivoting in a first plane;

a print cylinder rotationally attached the cylinder mount, the print cylinder rotating in a second plane that is substantially perpendicular to the first plane; and a supply tube, a first end of the supply tube connected to a reservoir, a second end of the supply tube located at the print cylinder, the supply tube usable to supply fluid from the reservoir to the print cylinder.

20. The system of claim 19, further comprising at least one additional printing device disposed of the print cylinder 90 adjacent the first printing device, wherein the at least one additional printing device is adjustably attached to the mounting frame.

21. The system of claim 19, further comprising at least one additional printing device adjustably attached to the mounting frame, wherein the at least one additional printing device is disposed opposite the first printing device to allow printing on opposing sides of an item to be printed.

22. The system of claim 19, further comprising at least one additional printing device adjustably attached to a second mounting frame disposed opposite the printing device to allow printing on opposing sides of an item to be printed.

23. The system of claim 19, wherein the mounting frame is adjustably attached to a conveyor system.

* * * * *